Oct. 7, 1941.  H. T. KRAFT  2,257,912
DRUM TYPE CLUTCH
Filed June 14, 1940
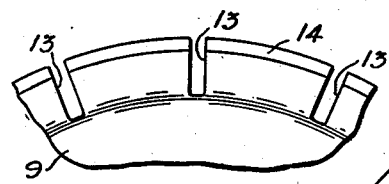
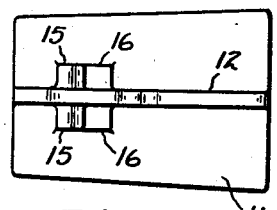
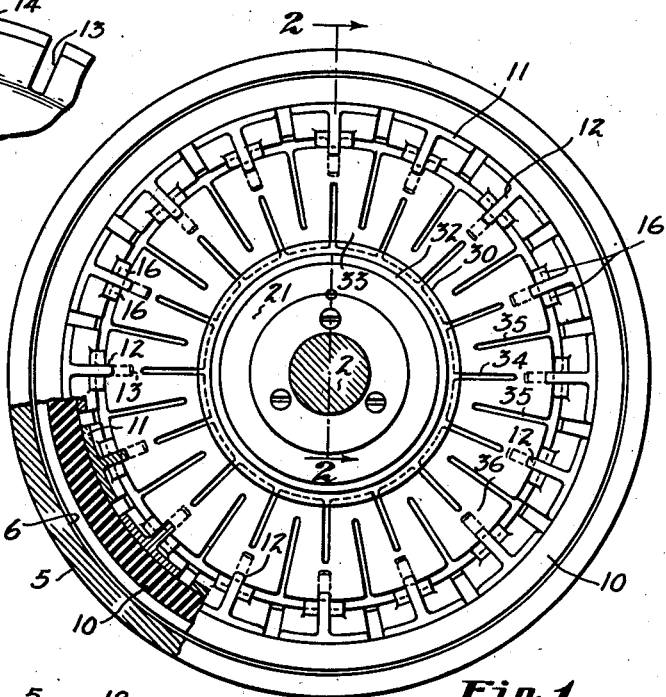
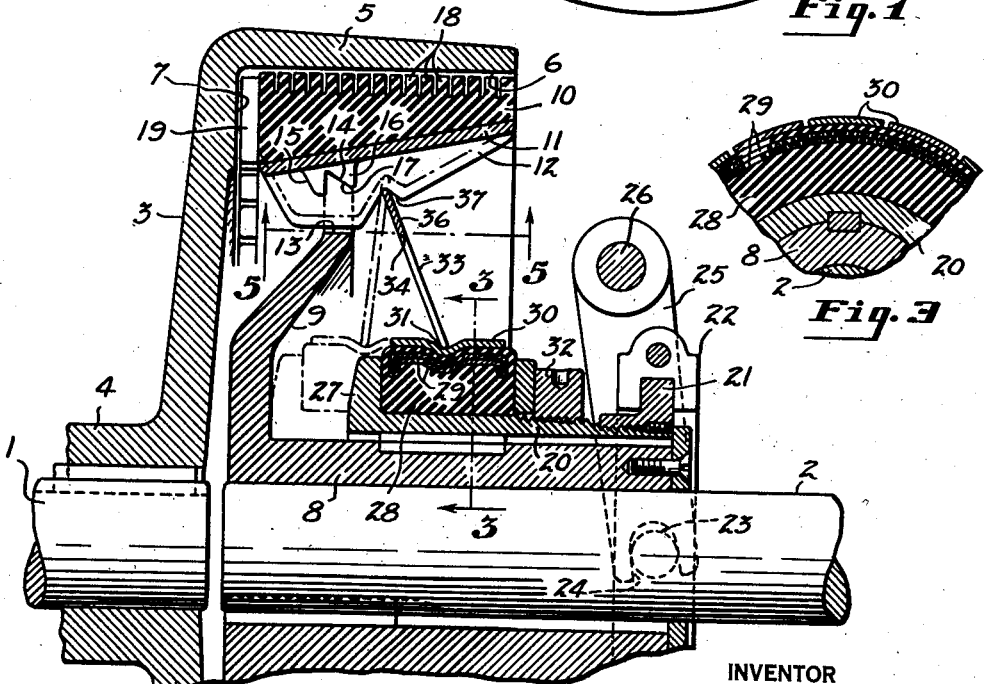
INVENTOR
*Herman T. Kraft*
BY *Evans + McCoy*
ATTORNEYS Patented Oct. 7, 1941

2,257,912

UNITED STATES PATENT OFFICE 2,257,912

DRUM TYPE CLUTCH

Herman T. Kraft, Akron, Ohio, assignor to The General Tire & Rubber Company, Akron, Ohio, a corporation of Ohio Application June 14, 1940, Serial No. 340,582

11 Claims. (Cl. 192—65)

This invention relates to clutches of the drum type in which the shiftable clutch element is in the form of an elastic expansible shoe which is movable into and out of engagement with the interior of the drum.

The present invention has for an object to provide improved means for actuating the elastic expansible shoe and for guiding the same in its movements into and out of engagement with the drum.

It is also an object of the invention to provide a clutch of the type described in which the shoe and drum have laterally disposed faces which are engaged prior to the engagement of the peripheral faces of the shoe and drum in such manner as to provide an initial slip connection which serves to overcome inertia and relieve stresses and wear upon the main peripheral engaging surface of the drum and shoe.

A further object of the invention is to provide means for varying the clearance between the elastic expansible shoe and the drum to compensate for wear and to insure adequate pressure upon the engaging faces when the shoe is engaged with the drum.

With the above and other objects in view, the invention may be said to comprise the clutch illustrated in the accompanying drawing hereinafter described and particularly set forth in the appended claims, together with such variations and modifications thereof as will be apparent to one skilled in the art to which the invention pertains. Reference should be had to the accompanying drawing, in which:

Figure 1 is a side elevation of the clutch with a portion broken away to show the drum and shoe in section;

Fig. 2 is a fragmentary radial section on an enlarged scale taken on the line indicated at 2—2 in Fig. 1;

Fig. 3 is a fragmentary section taken on the line indicated at 3—3 in Fig. 2;

Fig. 4 is a fragmentary side elevation of a peripheral portion of the shoe supporting disk; and Fig. 5 is a bottom plan view of one of the base segments of the shoe.

In the accompanying drawing the clutch of the present invention is shown applied to shafts 1 and 2 disposed end to end and substantially in axial alignment. A drum 3 is mounted on the shaft 1 and has a hub 4 which is fixed to the shaft 1 and a peripheral flange 5, which has an interior engaging face 6 which is a surface of revolution concentric with the drum axis. Inwardly of the flange 5 a lateral engaging face 7 is formed on the body portion of the drum. The shaft 2 has a sleeve 8 fixed thereto which has a flange 9 at its inner end which is in the form of a disk and serves to support an annular endless elastic and expansible rubber shoe 10. The shoe 10 is an integral one-piece rubber ring which is molded to an external diameter somewhat less than the internal diameter of the internal face 6 of the drum, so that the shoe in its normal position on the supporting flange or disk 9 is out of engagement with the drum, the running clearance between the drum and shoe being preferably just sufficient to insure complete disengagement of the shoe. The shoe 10 has a series of base segments 11 secured upon the interior thereof. The base segments 11 are preferably rigid metal members which extend the full width of the interior face of the rubber ring and which are rigidly attached to the rubber ring, preferably by vulcanization. The base members 11 are regularly spaced throughout the circumference of the ring and each has a radially inwardly projecting axially extending flange 12. The supporting flange or disk 9 has a series of radial slots 13 which receive the flanges 12 of the base segments of the shoe. Engagement of the flanges 12 in the slots 13 provides a driving connection between the disk 9 and the shoe so that the shoe is constrained to rotate with the disk 9 and the shaft 2 to which it is fixed. The flanges 12 are free to move radially in the slots 13 so that the shoe 10 can expand or contract. The disk 9 is provided with a beveled edge 14 at its periphery and the base segments 11 are provided with spaced lugs 15 and 16 adjacent the flanges 12 which engage with the edge portion of the disk 9. The inner lugs 15 have flat faces engaging the inner face of the disk 9, and the outer lugs 16 have beveled faces 17 which fit upon the beveled edges 14 of the disk. In the normal innermost radial position of the shoe both the lugs 15 and the lugs 16 are in engagement with the peripheral portion of the disk 9. Upon expansion of the shoe, the shoe is guided outwardly and laterally upon the beveled faces 14 and 17 of the disk and shoe.

The peripheral face of the shoe 10 may be made slip-resisting by means of flexible circumferential ribs 18 formed between deep narrow circumferential grooves. This flexible ribbed tread is yieldable under radial pressure so that exact regulation of the expanding movement of the shoe actuating members is not necessary. The flexible ribs also greatly increase the frictional resistance to slippage between the shoe and drum. The shoe 10 also has a side face 19 which may be in the form of a ring of suitable friction material which is engageable with the lateral engaging face 7 of the drum.

Suitable means is provided for expanding the shoe 10 into engagement with the drum, the actuating means being preferably so constructed and arranged as to apply a radial outward thrust at spaced points throughout the interior of the shoe and also to apply an axial thrust to the shoe to cause the shoe to move axially toward the engaging face 7 of the drum as it is expanded, bringing the side face 19 of the shoe into engagement with the lateral face 7 of the shoe prior to engagement of the periphery of the shoe with the interior of the drum, so that an initial slip connection is established between the drum and shoe prior to full engagement, with the result that the inertia of the parts being started into rotation is to a large extent overcome before the clutch elements are fully engaged.

The shoe expanding mechanism, which is of the type disclosed and claimed in my copending application Serial No. 340,581, filed June 14, 1940, is operated by a sliding sleeve 20 which is keyed upon the sleeve 8. The sleeve 20 has a flange 21 at its outer end which fits within a non-rotating shifter collar 22 which is provided with trunnions 23 engaging slots 24 in a forked lever 25 which is mounted to rock about a fixed shaft 26. By rocking the lever 25, the sleeve 20 can be moved inwardly or outwardly upon the sleeve 8. The sleeve 20 has a flange 27 at its inner end and a rubber collar 28 mounted thereon adjacent the flange. The rubber collar 28 may have a fabric reinforcement 29 and is provided with an outer surface formed by a series of closely spaced plates 30 which are attached to the periphery of the collar, preferably by vulcanization. Plates 30 are provided with central grooves 31 which are aligned to provide a continuous groove around the periphery of the collar. The collar is held in place against the flange 27 by means of a nut 32. By tightening the nut 32, the rubber collar 28 may be compressed to expand the periphery thereof to a greater diameter. The rubber collar serves as a support for the inner ends of thrust members through which expanding force is applied to the elastic shoe 10. The collar 28 is connected to the shoe 10 in such way that axial movement of the collar applies radial outward thrust to the interior of the shoe by means of a conical steel disk 33 which has a central opening to receive the collar 28 and which is made flexible by means of a series of radially extending slots 34 extending outwardly from the central opening and a series of radially extending slots 35 which extend inwardly from the periphery of the disk between the slots 34. The central opening of the disk 33 is of a size to receive the collar 28 with the interior edge of the disk seated in the grooves 31 of the plates 30. The radial slots 34 and 35 provide a series of independently movable thrust arms 36 between the collar 28 and the shoe 10 which engage in notches 37 in the ribs 12. Axial pressure applied to the disk 33 by axial movement of the sliding sleeve 20 causes the arms 36 to rock inwardly and the disk to gradually flatten. The sleeve 20 may be moved inwardly until the inner end thereof comes into engagement with the end flange or disk 9 of the sleeve 8 and in this position the thrust arms 36 of the disk will have been moved slightly past the position in which they are perpendicular to the axis, and the contractive resiliency of the shoe will serve to hold the clutch in its engaging position. The shoe 10 may be of gradually decreasing radial thickness from its inner to its outer edge in order to obtain a better distribution of the pressure exerted by the arms 36 upon the base segments 11 of the shoe.

When the clutch actuating thrust arms 36 are in the position shown in Fig. 2, they are disposed at a considerable inclination with respect to a plane perpendicular to the axis of the clutch and the initial thrust applied by these arms to the shoe has a substantial component in an axial direction so that the initial movement of the shoe is along the conical beveled edge of the disk 9, causing the engagement of the faces 7 and 19 prior to the engagement of the periphery of the shoe with the interior face 6 of the drum. However, after full engagement of the shoe with the drum, the angle of inclination of the thrust arms 36 is reversed so that pressure between the faces 7 and 19 is relieved and the entire load is carried by the peripheral faces of the drum and shoe.

It is to be understood that variations and modifications of the specific devices herein shown and described for purposes of illustration, may be made without departing from the spirit of the invention.

What I claim is:

1. A clutch comprising a rotatable drum, a rotatable inner member substantially concentric with the drum, an expansible shoe carried by said inner member and rotatable therewith, said shoe comprising an endless elastic rubber tread which is normally of a size to provide a running clearance between the tread and the interior of the drum, and a series of base segments attached to the interior of the tread and mounted on the inner member for movement inwardly toward and outwardly away from the axis of said member, and means for applying a radial outward thrust simultaneously to said segments to expand said tread into engagement with the interior of the drum.

2. A clutch comprising a rotatable drum, a rotatable inner member substantially concentric with the drum, an expansible shoe carried by said inner member and rotatable therewith, said shoe comprising an endless elastic rubber tread which is normally of a size to provide a running clearance between the tread and the interior of the drum and a series of base segments attached to the interior of the tread and mounted on the inner member for movement inwardly toward and outwardly away from the axis of said member, means comprising an actuating member and thrust transmitting members interposed between said actuating member and said segments for applying a radial outward thrust simultaneously to said segments to expand said tread into engagement with the interior of the drum, and means for simultaneously adjusting said thrust members with respect to said actuating member to vary the clearance between the tread and drum.

3. A clutch comprising a rotatable drum, a rotatable inner member substantially concentric with the drum, an expansible shoe carried by said inner member within the drum and rotatable therewith, said shoe comprising an endless elastic rubber tread member and a series of spaced base segments mounted for inward and outward movement on said inner member and attached to the interior of said tread member, an actuating member mounted for axial movement on said inner member, thrust transmitting members interposed between said actuating member and said segments, said thrust transmitting elements being connected at their inner ends to said actuating member for axial movement therewith and being rockable from an inclined position to and slightly past a position perpendicular to the axis of the clutch, and means for operating said actuating member.

4. A clutch comprising a rotatable drum, a rotatable inner member substantially concentric with the drum, an expansible shoe carried by said inner member within the drum and rotatable therewith, said shoe comprising an endless elastic rubber tread member and a series of base segments mounted for inward and outward movement on said inner member and attached to the interior of said tread member, an actuating member mounted for axial movement on said inner member, said actuating member being rotatable with the inner member, thrust transmitting members interposed between said actuating member and said segments, said thrust transmitting elements being connected at their inner ends to said actuating member for axial movement therewith and being rockable from an inclined position to and slightly past a position perpendicular to the axis of the clutch, means for operating said actuating member, and means carried by said actuating member to adjust the inner ends of said thrust members with respect to said actuating member to adjust said shoe with respect to the drum.

5. A clutch for connecting a driving shaft and a driven shaft disposed end to end substantially in axial alignment, comprising a drum having a hub portion secured to one of said shafts and a body portion provided with a circumferential flange overhanging the second shaft, the body portion of the drum having lateral engaging face inwardly of said flange, a supporting member secured to said second shaft, an elastic expansible annular shoe mounted on said supporting member for rotation therewith, said shoe having a peripheral face for engagement with the interior of the drum and a side face for engagement with the lateral engaging face of the drum and being slidably mounted on said supporting member for lateral and radial outward movements, and means for exerting a combined lateral and outward radial thrust upon the shoe to shift said shoe laterally upon the supporting member into engagement with the lateral engaging face on the body of the drum and to expand the shoe into engagement with the interior of the drum flange.

6. A clutch for connecting a driving shaft and a driven shaft disposed end to end substantially in axial alignment, comprising a drum having a hub portion secured to one of said shafts and a body portion provided with a circumferential flange overhanging the second shaft, the body portion of the drum having a lateral engaging face inwardly of said flange, a supporting member secured to said second shaft, an elastic expansible annular shoe mounted on said supporting member for rotation therewith, said shoe having a peripheral face for engagement with the interior of the drum and a side face for engagement with the lateral engaging face of the drum and being movable radially and laterally with respect to said supporting member, and means for exerting a combined lateral and outward radial thrust upon the shoe to engage the side face thereof with the lateral engaging face on the body of the drum and to expand the shoe into engagement with the interior of the drum flange comprising an axially movable member carried by said supporting member and rocking thrust members interposed between said axially movable member and shoe.

7. A clutch for connecting a driving shaft and a driven shaft disposed end to end substantially in axial alignment, comprising a drum having a hub portion secured to one of said shafts and a body portion provided with a circumferential flange overhanging the second shaft, the body portion of the drum having a lateral engaging face inwardly of said flange, a supporting member secured to said second shaft, an elastic expansible annular shoe mounted on said supporting member for rotation therewith, said shoe having a peripheral face for engagement with the interior of the drum and a side face for engagement with the lateral engaging face of the drum and being movable radially and laterally with respect to said supporting member, means for exerting a combined lateral and outward radial thrust upon the shoe to engage the side face thereof with the engaging face on the body of the drum and to expand the shoe into engagement with the interior of the drum flange comprising an axially movable member carried by said supporting member and rocking thrust members interposed between said axially movable member and shoe, and means for adjusting said rocking members with respect to said axially movable member to vary the clearance between the engaging faces of the shoe and drum.

8. A clutch comprising a rotatable drum having an interior engaging face, an elastic expansible endless annular rubber shoe within the drum, a series of spaced base segments attached to the interior of said shoe, each segment having an interior radially disposed flange, a rotatable member concentric with the drum and having radial slots to receive the ribs of said supporting segments, an axially movable sleeve mounted on said rotatable member and rotatable therewith, rocking thrust members interposed between said sleeve and said segments, and means for moving said sleeve axially to expand said shoe.

9. A clutch comprising a rotatable drum having an interior engaging face, an elastic expansible endless annular rubber shoe within the drum, a series of spaced base segments attached to the interior of said shoe, each segment having an interior radially disposed flange, a rotatable member concentric with the drum and having radial slots to receive the ribs of said supporting segments, an axially movable sleeve mounted on said rotatable member and rotatable therewith, rocking thrust members interposed between said sleeve and said segments, means for moving said sleeve axially to expand said shoe, and means for expanding the portion of the sleeve engaging said thrust members to exert an outward thrust on the shoe to vary the clearance between the shoe and drum.

10. A clutch comprising a rotatable drum having an interior engaging face, a shaft coaxial with the drum, an expansible annular shoe within the drum, a shoe supporting member fixed to said shaft, means connecting said shoe to the supporting member for rotation therewith, a sleeve slidable on said shaft, an expansible collar on said sleeve, rocking thrust members interposed between said collar and the interior of the shoe, means for sliding said sleeve on said shaft to expand the shoe into engagement with the drum, and means for expanding said collar to vary the clearance between the shoe and drum.

11. A clutch comprising a rotatable drum having an internal face concentric with its axis and a lateral face inwardly of said internal face, an inner rotatable member substantially concentric with the drum, an elastic expansible endless annular shoe mounted on said inner member for rotation therewith, said shoe having an external face for engagement with the interior face of said drum and a lateral face for engagement with the lateral face of the drum, means for guiding said shoe on said inner member for movement axially and outwardly, and means for exerting an outward thrust upon the interior of the shoe in a direction inclined toward the lateral face of the drum whereby the shoe is first moved laterally into engagement with said lateral face of the drum and then expanded into engagement with the interior face of the drum.

HERMAN T. KRAFT.